United States Patent [19]

Panuska et al.

[11] Patent Number: 5,125,063
[45] Date of Patent: Jun. 23, 1992

[54] LIGHTWEIGHT OPTICAL FIBER CABLE

[75] Inventors: Andrew J. Panuska, Buford; Parbhubhai D. Patel, Dunwoody, both of Ga.

[73] Assignee: AT&T Bell Laboratories, Murray Hill, N.J.

[21] Appl. No.: 610,617

[22] Filed: Nov. 8, 1990

[51] Int. Cl.⁵ .............................. G02B 6/44
[52] U.S. Cl. ................... 385/113; 385/109
[58] Field of Search ............ 350/96.23, 96.3, 96.1; 385/109, 101, 100, 111, 112, 113

[56] References Cited

U.S. PATENT DOCUMENTS

| | | | |
|---|---|---|---|
| 4,037,922 | 7/1977 | Claypoole | 350/96.23 |
| 4,082,423 | 4/1978 | Glista et al. | 350/96.23 |
| 4,446,686 | 5/1984 | Panuska et al. | 350/96.23 |
| 4,610,505 | 9/1986 | Becker et al. | 350/96.23 |
| 4,701,016 | 10/1987 | Gartside, III et al. | 350/96.23 |
| 4,723,831 | 2/1988 | Johnson et al. | 350/96.23 |
| 4,770,489 | 9/1988 | Saito et al. | 350/96.23 |
| 4,826,278 | 6/1989 | Gartside, III et al. | 350/96.23 |
| 4,836,639 | 6/1989 | Shamoto et al. | 350/96.23 |
| 4,836,640 | 6/1989 | Gortside, III et al. | 350/96.23 |
| 4,844,575 | 7/1989 | Kinard et al. | 350/96.23 |
| 5,015,063 | 5/1991 | Panuska et al. | 350/96.23 |
| 5,020,875 | 6/1991 | Arroyo et al. | 350/96.23 |

FOREIGN PATENT DOCUMENTS

| | | |
|---|---|---|
| 2551210 | 5/1977 | Fed. Rep. of Germany . |
| 2635917 | 2/1978 | Fed. Rep. of Germany . |
| 3024310 | 1/1982 | Fed. Rep. of Germany . |
| 3320072 | 6/1984 | Fed. Rep. of Germany . |
| 3815565 | 11/1989 | Fed. Rep. of Germany . |
| 2497964 | 7/1982 | France . |

OTHER PUBLICATIONS

M. Kawase, et al., "Simple Structure Optical Fiber Cables Manufactured Without Stranding Processes", Journal of Lightwave Technology. vol. 6, No. 8, Aug. 1988, pp. 1280-1284.

Shinohara, H. et al., "A New Simple Optical Cable Manufactured In a Single Process", *The Transactions of the IECI of Japan*, vol. E69, No. 4 Apr. 1986, pp. 357-359.

Miller, R., et al., "Tactical Low Loss Optical Fiber Cables for Army Applications", *Proceedings of the 23rd Wire and Cable Symposium*, Dec. 3-5, 1974, pp. 260-270.

*Primary Examiner*—John D. Lee
*Assistant Examiner*—John Ngo
*Attorney, Agent, or Firm*—Edward W. Somers

[57] ABSTRACT

An optical fiber cable (20) ideally suited for aerial distribution use, for example, includes in a preferred embodiment at least one bundle (23) of optical fibers (25—25). The at least one bundle is disposed in a tubular member (30) which is made of a plastic material suitable for use in a relatively wide temperature range and which is enclosed by a sheath system (32). A predetermined excess length of fiber is caused to be disposed in the tubular member. The excess length of each fiber is such that it is sufficient to avoid undue strains on the fiber as the cable core is exposed to the elements and to forces imparted during handling such as during installation. On the other hand, the excess fiber length must not be so great as to result in undue curvature of the fiber or excessive interactive engagement of the fiber with an inner wall of the tubular member. As a result of the magnitude of the excess length of the optical fiber, the requirements which must be met by the sheath system are not as demanding as for prior art cables, thereby resulting in a significant reduction in cable diameter and weight.

11 Claims, 3 Drawing Sheets

LIGHTWEIGHT OPTICAL FIBER CABLE

TECHNICAL FIELD

This invention relates a lightweight optical fiber cable. More particularly, this invention relates to a cable comprising a plurality of optical fibers having excess length disposed in a tubular member and an armor-free sheath system which includes strength members and a jacket and which is optimized to minimize the diameter and the weight of the cable.

BACKGROUND OF THE INVENTION

Optical fiber cables have been in use for communications for some time. Because of the use of glass fibers as the communications medium instead of metallic conductors, it becomes necessary to include strength members in the cables. The cables which are in use have been provided by a number of different manufacturers, each having its own structural arrangement.

Present cable structures fall into two major classes, a loose tube arrangement and a loose fiber bundle arrangement. In a typical loose-tube arrangement, a maximum of fibers are packaged in an individual buffer tube, and several tubes are helically stranded together over a central member to form a core. In some optical fiber cables, strength members are disposed centrally of the cable cross section. See, for example, German Offenlegungsschrift 25 51 210 in which a plurality of individual tubes are arrayed about a central strength member. In such an arrangement, it is typical for the length of the optical fiber generally to equal the length of the tube and excess fiber length is provided by the radial position of the fibers in the helically stranded buffer tube. This construction inherently is space inefficient and results in relatively large and heavy cables.

On the other hand, the loose fiber bundle arrangement includes a plurality of unstranded fiber bundles disposed in a single core tube which extend in a direction along the center line of the cable without stranding. This arrangement which does not include a central strength member and in which strength members are disposed outside the core tube is better suited for low-fiber-count optimization than is the loose tube arrangement. A cable having a metallic armor layer and being based on the loose fiber bundle approach, is known in the art; however, it is limited to a single bundle which includes only twelve fibers.

In the loose fiber bundle approach, the strength members are included in a sheath system of the cable. As an example of the latter arrangement, see U.S. Pat. No. 4,826,278 which was issued on May 2, 1989 in the names of C. H. Gartside, III, A. J. Panuska, and P. D. Patel. Therein, at least one optical fiber bundle is disposed within a tubular member which may be made of polyvinyl chloride (PVC). The tubular member is enclosed in sheath system elements such as a water blocking tape and an outer jacket. Longitudinally extending strength members may be disposed in the outer jacket, generally adjacent to the tubular member.

It is not uncommon to have cables include a layer of metallic armor. Although such armor is used to provide rodent and lightning protection, it also cooperates with the jacket and longitudinally extending strength members to provide strength properties for the cable.

It also is not unusual to provide optical fiber cables with excess length optical fibers, that is, optical fibers each having a length which exceeds the length of the cable. This is done so that when the cables are handled and routed in tortuous paths during installation, undue strains will not be induced in the fibers. The excess length of fiber generally has been accomplished by applying controlled forces to the cable before takeup to stretch elastically the cable sheath components, allowing excess fiber lengths to become disposed in each increment of length of the cable as the stretching forces are released and the sheath components return to their unstretched length.

In the prior art, there has been reluctance to use a relatively high excess fiber length. The reason for such reluctance is the concern that too much excess fiber length results in undesired bending of fibers which leads to increased attenuation. As a result of the typically low excess fiber length, the strength member system which may be supplemented by a metallic armor layer must be sufficient to limit the stresses being imparted to the optical fibers. The strength member system must be such that any elongation of the cable under load will not exceed the safe strain limit of the optical fibers.

Customer input and requests have revealed that an economical, lightweight cable optimized for a maximum of twenty-four fibers is needed for predominantly aerial applications. To date, most engineering attention has been given to optical fiber cables with relatively high fiber counts used in point-to-point telephony applications. A relatively high percentage of optical fiber cable sales, however, have consisted historically of relatively low fiber counts, that is, no more than twenty-four fibers. A number of low fiber count cables are presently offered in the marketplace, but the structural arrangements are similar to those used in cables having a relatively high fiber count. Therefore, a need exists both in telephony and in specialty markets for an economical cable design optimized for low fiber counts. What is sought after is an economical cable that is relatively small in diameter and relatively low in weight yet one which retains excellent optical performance and which has a 600 lb tensile load rating. These requirements seemingly are at odds with the requirements for strength to prevent damage to the optical fibers.

What is needed and what seemingly is not available in the prior art is a cable having a limited number of optical fibers and which is relatively light in weight. Desirably, such a cable is relatively low in cost and can be made with existing manufacturing equipment.

SUMMARY OF THE INVENTION

The foregoing problems of the prior art have been overcome with an optical fiber cable of this invention. This is accomplished with a loose fiber bundle arrangement for the core and a sheath system which includes linear strength members. The optical fiber cable core includes at least one optical fiber transmission medium, and preferably, at least one bundle comprising a plurality of optical fibers. The at least one bundle is disposed in a tubular member.

Also, the length of each fiber in each bundle is longer than the length of the tubular member by a desired amount and is considerably longer than in prior art cables. The amount by which the fiber length exceeds the length of the tubular member which is referred to as excess fiber length is sufficient to prevent undue strains when the cable is subjected to the environment or to forces during handling. On the other hand, the excess fiber length, the cross sectional area of the optical fiber transmission media and the inner diameter of the tubular member are such as to avoid undesirably small radii of the fibers or excessive interactive engagement of the fibers with an inner wall of the tubular member, either of which would result in an increase in bending losses. The tubular member is made of a plastic material which may be characterized by a relationship between applied tensile forces and strain which is substantially linear up to a strain corresponding to the excess length of each transmission medium at a given temperature.

The core is enclosed in a sheath system which includes linearly extending strength members and a plastic jacket. Because of the excess length of the fibers over the length of the tubular member, the requirements of the strength member system may be relaxed. The relaxation of the requirements for the strength members results in less weight, less cost and a smaller outer cable diameter. As the amount of excess length increases, the tensile strength needs for the cable are reduced with an accompanying reduction in costs.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figures 1, 2:
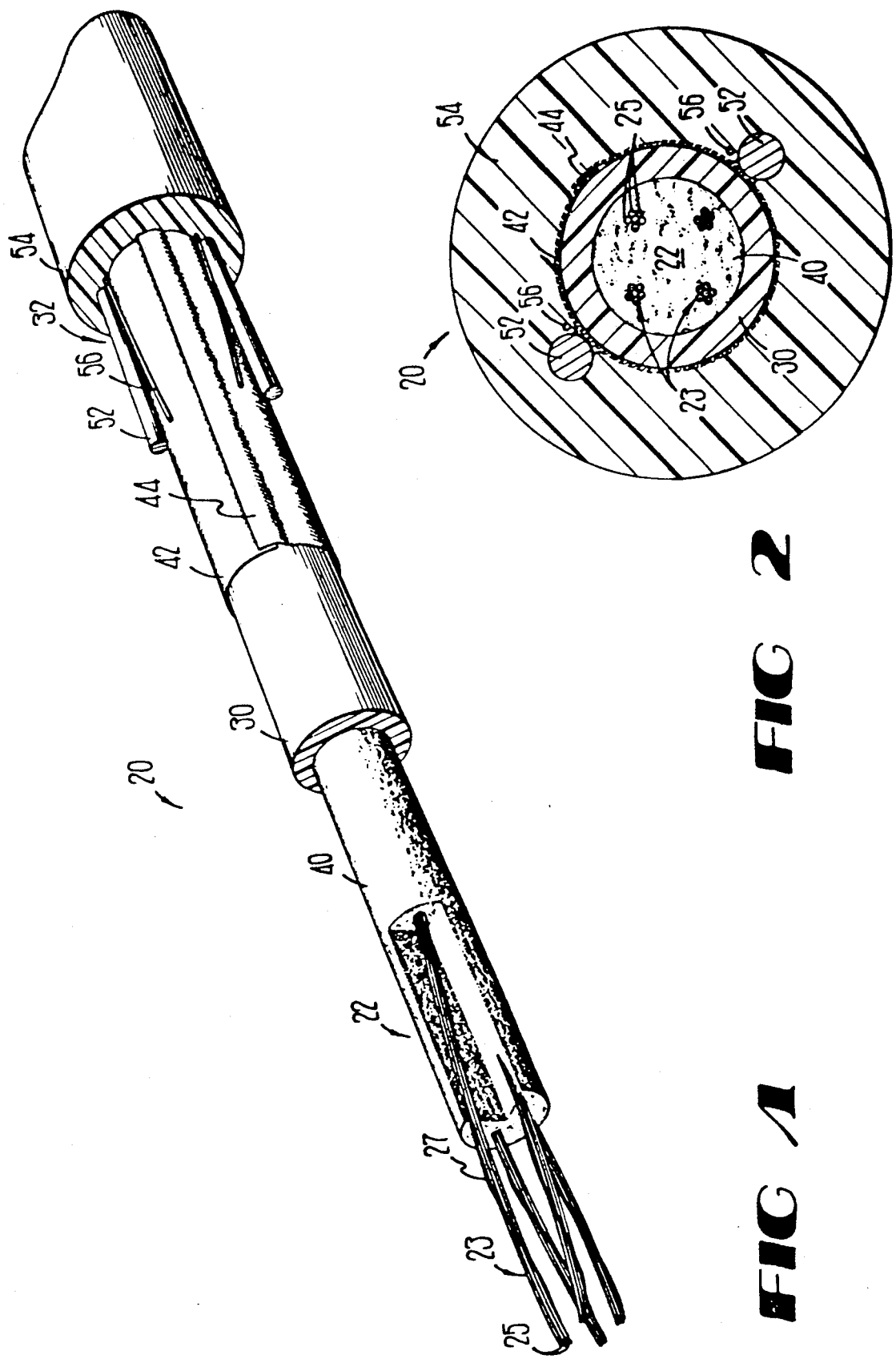
FIG. 1 is a perspective view of an optical fiber cable of this invention.
FIG. 2 is an end sectional view of the optical fiber cable of FIG. 1.

Referring now to FIGS. 1 and 2, there is shown an optical fiber cable which is designated generally by the numeral 20. The optical fiber cable 20 includes a core 22 which includes at least one optical fiber 25 and preferably, twenty-four optical fibers 25-25. Desirably, the optical fibers are arranged in four bundles 23-23 of six fibers each. In a preferred embodiment, each of the bundles is provided with a binder 27 which is wrapped helically about the plurality of optical fibers.

Enclosing the optical fiber is a tubular member 30. A sheath system 32 is disposed about the tubular member 30. The tubular member 30 generally is made of a plastic material such as high density polyethylene (HDPE), polyvinyl chloride (PVC), polybutylene terephthalate (PBT) or nylon, for example.

The tubular member 30 may have strength properties which are enhanced over those of prior art tubular members. Such a tubular member is made of a plastic material which exhibits a force-strain behavior which is linear up to a point and thereafter is non-linear, i.e., substantial elongation occurs without any accompanying substantial increase in force. For cable of this invention, the tubular member may comprise a plastic material which is characterized by a relationship between applied load and strain which is substantially linear over a substantial range. It may be linear up to a strain corresponding to the desired excess length of each optical fiber at a given temperature. The strain which corresponds to the desired excess length is equal to the sum of the strain corresponding to an applied load plus compensating strains which include the geometric strain and a strain attributed to temperature. The geometric strain accounts for the fiber being disposed in engagement with an inner portion of the tubular member 30 as the cable is advanced around a sheave to elongate the sheath system and thereby allow excess length to be come disposed therein as shown in U.S. Pat. No. 4,446,686 which issued on May 8, 1984 in the names of A. J. Panuska, M. R. Santana, and R. B. Sprow. If the compensating strains are not taken into account, the relaxation of the tubular member following elongation would result in an excess length which is less then that desired.

The cable 20 of this invention may also include waterblocking provisions, such as, for example, a filling material 40 (see FIG. 1). As is seen in FIG. 1, the filling material 40 may be disposed in the tubular member 30 and fill interstices among the bundles 23-23 and among the fibers 25-25 within each bundle. A filling material used in this design prevents the migration of water or other liquids along the cable core. The filling material is such that its rheological properties in the operating temperature range allow easy fiber movement when they are strained. This is accomplished by considering the critical shear stress behavior of the filling material. This property also is critical in terms of controlling excess fiber length during processing. Furthermore, at high temperatures, the filling material should remain in the cable and pass a flow test at 70° C. The material should be non-volatile, non-toxic, and chemically compatible with the optical fibers and other cable components. The filling material also should be stable over the service life of the product. A suitable filling material 40 which has been used in the past is a colloidal gel such as that which is disclosed in U.S. Pat. No. 4,701,016 which was issued on Oct. 20, 1987 in the names of C. H. Gartside, III, A. C. Levy, Bob J. Overton, and Carl R. Taylor and which is incorporated by reference hereinto.

A grease composition comprising oil, colloidal particle filler, and, optionally, a bleed inhibitor is disclosed in the above-identified Gartside, et al. U.S. Pat. No. 4,701,016. The grease typically has a critical yield stress below 140 Pa at 20° C., preferably below 70, or 35 Pa for some applications, and a shear modulus which is less than about 13 kPa at 20° C. Preferred compositions comprise 77 to 95% b.w. of ASTM type 103, 104A, or 104B paraffinic or naphthenic oil, or polybutene oil; 2 to 15% b.w of hydrophobic or hydrophilic fumed silica; and, optionally, up to 15% b.w. of styrene-rubber or styrene-rubber-styrene block copolymer, or semiliquid rubber.

In a preferred embodiment, the waterblocking provisions may include a suitable waterblocking tape 42 having an overlapped seam 44 or yarn (not shown). Such an arrangement is disclosed in U.S. Pat. No. 4,909,592 which issued on Mar. 20, 1990 in the names of C. J. Arroyo and P. F. Gagen and which is incorporated by reference hereinto.

An important characteristic of the core of this invention is its packing density. Packing density, $p_p$, is defined as the ratio between the cross-sectional area of all the optical fibers and any coatings thereon, $(n)(a_f)$, where n is the number of fibers in the core and $a_f$ is the cross sectional area of each optical fiber which includes any coating or buffering materials, and the total cross-sectional area enclosed by the tubular member 30, which area is designated as $a_t$. Mathematically $$p_p = \frac{na_f}{a_t}$$

and may be expressed in terms of a percent. Cables with a high packing density result in compact and lightweight cables. The loose fiber bundle design offers a higher packing density than an individual buffer tube design because the fiber bundles share a common space in a single core tube rather than in a plurality of core tubes; however, problems may occur with an increase in packing density because the fibers are more confined. If the packing density is too high, optical fibers within the core may experience relatively high stress and could break during handling of the cable. This occurs when the packing density is too high because as with the use of filling materials which are used for water blocking and which yield at a relatively high stress, the optical fiber cannot move sufficiently within the tube to relieve stresses such as would occur in bending. In the prior art, this problem was overcome by stranding individual buffer tubes each of which encloses a fiber or a fiber bundle. However, as is well-known, stranding requires a lower processing speed and results in increased costs. Further, such a cable including a plurality of individual buffer tubes results in an increased cable diameter and weight. It has been found that the predetermined value for packing density for optical fiber cable cores of this invention is one that does not exceed a value of about 0.5.

Figure 3:
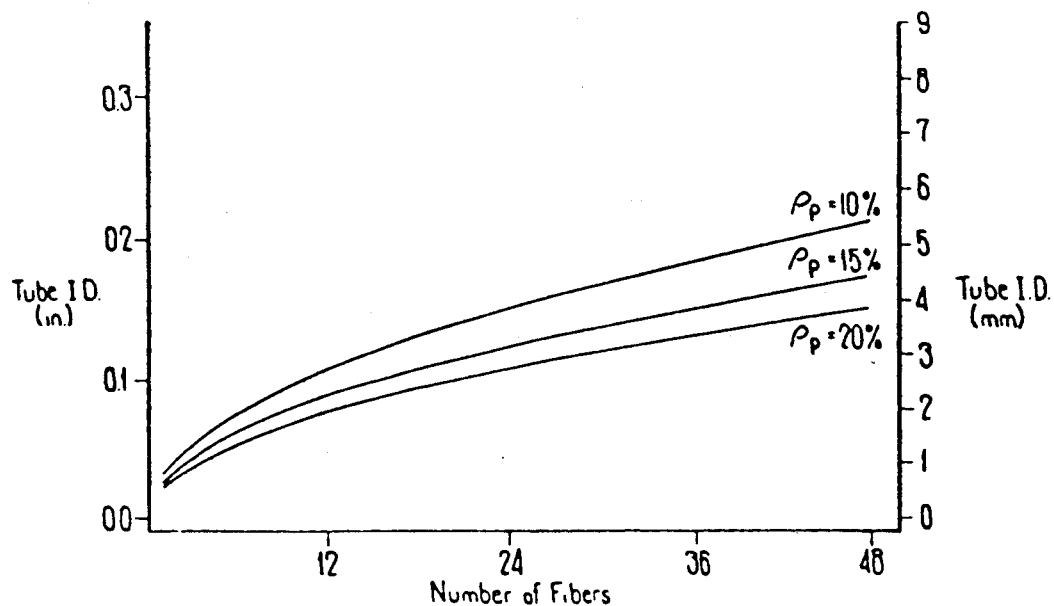
FIG. 3 is a graph in which the inner diameter of a tubular member enclosing a core of optical fibers is plotted against the number of optical fibers in the core for several packing densities.

For a given packing density, a core tube may be sized from the curves depicted in FIG. 3 for a given number of fibers. Cables having a relatively high packing density result in compact, lightweight structures. However, as mentioned hereinabove, care must be taken because the fibers are more confined with increasing packing density.

Also, the optical fibers 25—25 are provided with excess length, $\epsilon$. That is, each of the optical fibers has a length ($L_f$) which exceeds the length ($L_c$) of the cable 20. The excess fiber length, $\epsilon$, generally is given in terms of percent excess length, $$\epsilon(\%) = 100[(L_f - L_c)/L_c] \quad (1)$$

As a result, when the optical fiber cable core 22 is subjected to tensile loadings, the tubular member 30 will elongate before any loads are applied to optical fibers therewithin.

Traditionally, a small amount of excess fiber length, on the order of about 0.1%, has been provided in a loose fiber bundle cable to insure that the optical fiber does not exceed short-term safe design strain limits which typically is on the order of 0.33% for 50 kpsi proof-tested fibers. By increasing and controlling the excess length, an advantage may be had. For example, a 0.1% increase in excess length would allow a corresponding 30% reduction in tensile stiffness for 50 kpsi proof-tested fibers.

The provision of excess optical fiber length or overstuffing as it sometimes is called may result in microbends and/or macrobends which could result in unacceptably high losses. A microbend is defined as a small perturbation in the fiber axis that cannot be seen with the unaided eye. This type of bend is only a few nanometers in amplitude and has a period of a fraction of a millimeter. On the other hand, a macrobend is a relatively large amplitude perturbation in the fiber axis, i.e., on the order of a few millimeters that can be seen with the unaided eye. Macrobends and microbends have the net effect in causing undesired losses in optical fiber transmission, particularly at lower temperatures such as, for example, $-40°$ C. These bending effects can occur from coating, cabling, installation and temperature, etc.

Care must be taken when providing the excess length of the optical fiber to avoid macrobending and microbending. Fiber undulations are the natural consequence of overstuffing. As a result, the optical fiber can expand or contract when subjected to tensile or compressive forces. Care must be taken when causing the optical fiber to have an undulatory configuration to avoid too small a radius. If the radius is too small, undesirable losses due to macrobending may occur. The undulatory wavelength decreases with increased overstuffing. As more and more fiber is caused to occupy each successive increment of length of the tubular member which has a fixed inner diameter, the fibers assume paths of decreasing radius which can cause macrobends in the fiber and result in unwanted losses.

A further consideration is the inner diameter of the tubular member 30. That inner diameter of course determines the volume available for the optical fibers within the core. Also, the bending radius of the optical fiber may decrease as the inner diameter of the tubular member 30 decreases for the same excess length of fiber. The choice of a relatively small core tube diameter results in a relatively short undulation length, which in turn may result in increased loss.

Further, as more excess length is provided, the optical fibers are urged against the inner wall of the tubular member. When this engagement occurs, the optical fiber inside the coating material may bend. This could cause a relatively small distortion of the optical fiber axis within the coating, causing microbending and leading to loss.

The strength of optical fibers degrades or flaw size grows under the influence of time, stress and humidity. For a constant stress, this phenomenon is commonly known as static fatigue. Based on static fatigue considerations for a 40 year life, the minimum allowable bend radius is about 45 mm for a 50 kpsi proof-tested fiber. Again, this value is conservative because the probability of failure in bending is significantly less than in uniform tension. This provides one constraint on the minimum bend radius for the fiber. The other constraint is the increase in attenuation due to bending.

Optical fibers in a loose fiber bundle arrangement such as is shown in FIG. 1 assume a path of least resistance to accomodate the excess length. This path may be treated mathematically as having a shape of either a helix or of a sinusoid.

Figure 4:
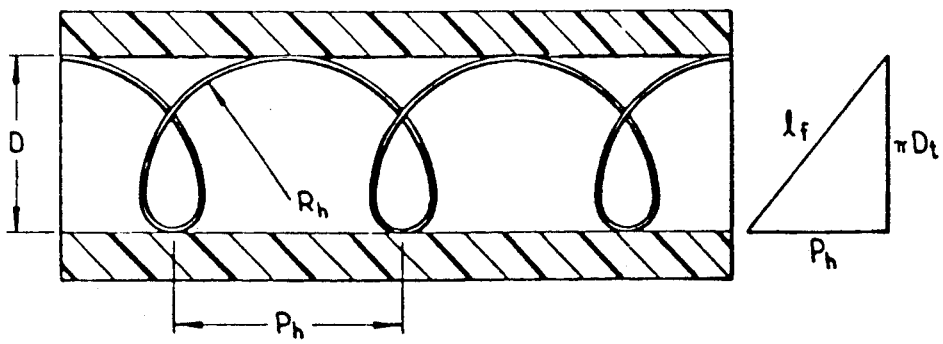
FIGS. 4 and 5 are schematic representations of paths which optical fiber of the cables of this invention may take.
Figure 5:
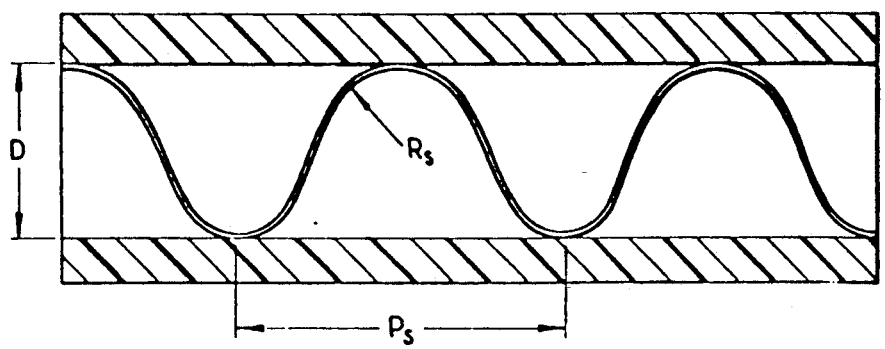

Schematics of helical and sinusoidal models with corresponding geometric parameters are shown in FIGS. 4 and 5, respectively. Consider first a helical (subscript h) model in FIG. 4 to derive excess fiber length as a function of the inside diameter (D) of the tubular member 30, of the fiber bundle diameter (d), of the pitch or lay length (P), and of the radius of curvature (R) of a fiber bundle.

The fiber or fiber bundle length ($l_f$) for a period of the helix curve, the excess fiber length ($\epsilon_{eh}$), and the radius of curvature ($R_h$) for the helix model are given by the following equations:

$$l_f = [P_h^2 + (\pi D_t)^2]^{\frac{1}{2}}; \tag{2}$$

$$\epsilon_{eh} = 100\left[\left(1 + \left(\frac{\pi D_t}{P_h}\right)^2\right)^{\frac{1}{2}} - 1\right]; \text{ and} \tag{3}$$

$$R_h = \frac{D_t}{2}\left[\left(\frac{P_h}{\pi D_t}\right)^2 + 1\right] \tag{4}$$

where the relationship between the helix pitch diameter $D_t$ and radius $R_t$ is given by:

$$D_t = 2R_t = D - d. \tag{5}$$

Combining Equations (3) and (4) results in:

$$\frac{R_h}{R_t} = \frac{a}{a-1}; \text{ and} \tag{6}$$

$$\frac{P_h}{R_t} = 2\pi\left[\frac{1}{a-1}\right]^{\frac{1}{2}} \tag{7}$$

where $$a = \left(1 + \frac{\epsilon_{eh}}{100}\right)^2. \tag{8}$$

Figure 6:
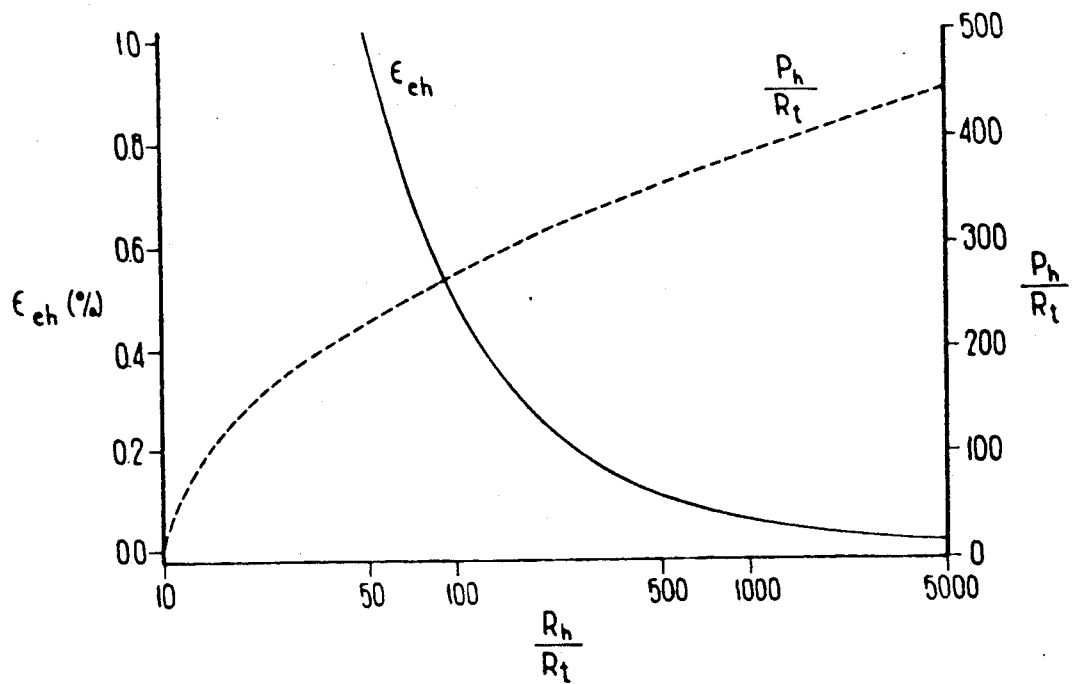
FIGS. 6 and 7 show excess length for helical and sinusoidal configurations of fibers in the cables of this invention.

FIG. 6 shows curves of $\epsilon_{eh}$ and $P_h/R_t$ as a function of bend radii for the helix model.

For the sinusoidal (subscript s) model, the length of fiber or fiber bundle, $l_f$, for a period along the sinusoidal curve of FIG. 5 is given by:

$$l_f = \frac{2P_s}{\pi}\int_0^{\frac{\pi}{2}} (1 + k^2\cos^2\phi)^{\frac{1}{2}} d\phi \tag{9}$$

where $$k = \frac{\pi D_t}{P_s}. \tag{10}$$

The integral in Equation (9) is an elliptical integral of the second kind which can be represented by an infinite series. The excess fiber length ($\epsilon_{es}$) for the sinusoidal model is given by:

$$\epsilon_{es} = 100[(1 + k^2)^{\frac{1}{2}}(1 - p) - 1] \tag{11}$$

where $$p = \frac{1}{4}q^2 + \frac{3}{64}q^4 + \frac{1}{256}q^6 + \ldots; \tag{12}$$

and $$q = \frac{k}{(1 + k^2)^{\frac{1}{2}}}. \tag{13}$$

The minimum radius of curvature for the sinusoidal model is given by $$R_s = \frac{D_t}{2}\left(\frac{P_s}{\pi D_t}\right)^2. \tag{14}$$

From Equation (11), it may be observed that the first term is the same as the excess fiber length for the helical model and that the sinusoidal model gives a lower value for excess length. Furthermore, the radius of curvature for the helical model is constant along the curve in contrast with a variable radius of curvature for the sinusoidal model. For a given excess fiber length, the sinusoidal model is conservative and yields a lower minimum radius than the helical model.

Combining equations (11) and (14) yields:

$$\frac{R_s}{R_t} = \frac{1 - q^2}{q^2}; \text{ and} \tag{15}$$

$$\frac{P_s}{R_t} = 2\pi\left[\frac{1 - q^2}{q^2}\right]^{\frac{1}{2}}. \tag{16}$$

Figure 7:
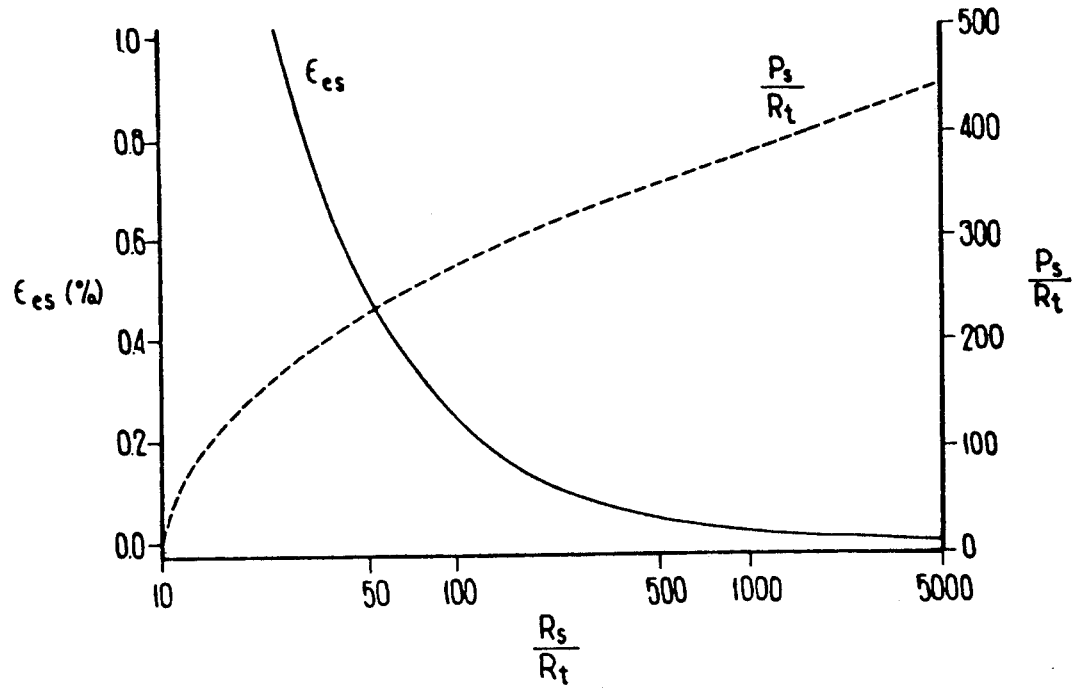

FIG. 7 shows two curves for $\epsilon_{es}$ and $P_s/R_t$ as a function of minimum bend radii for the sinusoidal model.

Each of the optical fibers is bent to a radius depending on the amount of excess fiber length and the diameter of the tubular member 30. Minimum bend radius for a given number of fibers is obtained by using the sinusoidal model. Environmental effects must also be considered because the worst case occurs at the lowest operating temperature. This minimum bend radius can be used in conjunction with the fiber parameters to estimate the increase in attenuation. In general, attenuation increases at 1300 nm and 1550 nm are insignificant at bend radii greater than 30 mm in presently available single mode fibers.

Problems of prior art cables have been overcome by considering several factors in arriving at the arrangement of the optical fiber cable core of this invention. From given information, a model is used to calculate the inner diameter of the tubular member 30 in order to achieve a predetermined minimum bend radius which results in minimum attenuation.

Usually, the parameters of number of optical fibers and excess length are given or determined. Once the diameter of the tubular member 30, and the excess fiber length are known and the shape is modeled, the fiber radius is found and from that, the loss is predicted. This approach is based on the recognition that the excess length and the inner diameter of the tubular member 30, the lay length and the bend radius of each fiber are interrelated. Adjustments may be made to ensure that the attenuation is held substantially to a minimum value. It has been determined that the excess length of each optical fiber of optical fiber cables of this invention may be as much as about one percent without causing unacceptable losses.

Based on the above considerations, the core size for a given number of fibers and excess length is optimized. For example, using FIG. 3, a tentative diameter of the tubular member 30 can be obtained by assuming a packing density which ranges between 10% and 20% for a given number of fibers. Then a minimum bend radius can be obtained from FIGS. 6 and 7 for a given excess fiber length. Finally, bending losses are estimated to determine if the attenuation increase is acceptable. This process may be repeated until a satisfactory arrangement is obtained.

The cable core of this invention is optimized with respect to excess length of fiber which advantageously reduces the strain on the fiber when the cable core is loaded. This has been accomplished by recognizing the interrelationship of a number of factors, namely, the excess length, number and cross sectional area of fibers, inner diameter of the tubular member 30, lay length and minimum bend radius of the optical fibers. As a result, lower requirements for a sheath system of the cable 20 may be used. The sheath system must be such that it protects fibers from the rigors of processing, installation, and service environments. Specifically, fibers must be guarded against excessive tensile and compressive strains caused by these environments. The cable of this invention includes the sheath system 32 which includes two linear strength members 52—52 disposed in an outer jacket 54 to provide a composite structure. Although rip cords 56—56 are shown in FIG. 1, they are optional and may be provided as needed.

Polymeric materials which are used in cables shrink due to thermal contraction during processing. If this shrinkage is excessive, it induces high compressive strains on the fibers and the attenuation increases as the fibers are constrained to small bend radii. Various materials and techniques are used to overcome this problem. For example, strength members, e.g. metallic wires or glass rods, which have both tensile and compressive stiffness, and lightly-impregnated fiber glass rovings which have lower compressive stiffness are used to limit the excessive shrinkage with varying degree of success.

A linear tensile response curve of load versus strain of the cable 20 is desirable so that a predictable amount of excess fiber length can be used. Sheath systems which include linear steel members provide the desired linear response. However, the use of semi-rigid or lightly impregnated strength members alone do not offer enough compressive resistance and therefore result in a non-linear behavior with a "knee" in the response curve. A large knee in a stress-strain curve indicates that the cable sees higher strains at the rated load of 600 lbs. The knee effect must be compensated for by providing higher excess fiber length to limit installation strains on the optical fibers. What is important is that because of the excess length of fiber, the sheath system of cable of this invention may include non-metallic or metallic strength members which are characterized by a reduced stiffness and hence, which are less costly. Also, for many areas in which rodents are not a problem, an armor layer or comparable protection need not be included.

All cable components, including the core and the sheath system, must be stable over an operating temperature range of −40° C. to 70° C. for the life of the cable. The lightweight cable 20 of this invention was subjected to a series of mechanical tests to assure superior performance in the field. The tests were conducted according to the Bell Communications Research (Bellcore) and the Electronic Industries Association (EIA) test Procedure. The cable 20 meets or exceeds all of the requirements. Mechanical tests included low and high temperature levels as specified in § 5.1.1 of EIA 455-37, impact resistance as specified in § 5.1.2 of EIA 455-25A, compressive strength as specified in § 5.1.3 of EIA-455-41, tension strength as specified in § 5.1.4 of EIA-455-33A, cable twist as specified in § 5.1.5 of EIA-455-85, cyclic flex as specified in § 5.1.6 of EIA-455-104 and external freezing as specified in § 5.1.7 of EIA-455.98A. The cable 20 provides the same optical performance as cables which included a layer of metallic armor. Test results showed substantially zero added loss in cabling.

In addition to the mechanical tests, the cable 20 also was subjected to a standard Bellcore environmental tests. Test results show excellent thermal stability over a temperature and aging range of −40° C. to 85° C.

Advantages are realized by cable of this invention. Because cable of this invention includes a significant amount of excess length of fiber, strength provisions of the cable need not be as much as has been used in conventional cables with significantly less excess length. Also, the absence of a metallic armoring layer reduces the size and weight of the cable which is very important insofar as aerial installations are concerned and reduces manufacturing costs.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which comprises:
   a core which includes a plurality of optical fibers;
   a single tubular member which has a length and a circular cross section transverse to a longitudinal axis thereof and which encloses said optical fibers, said tubular member having a length which is significantly less than that of each of the optical fibers; and
   a sheath system which includes longitudinally extending strength members and a jacket which comprises a plastic material and which is disposed about said core, with the excess length of each optical fiber, the cross sectional area of each optical fiber in said tubular member and the inner diameter of said tubular member being such as to avoid bending losses which are caused by excessive curvature in the optical fibers and by excessive interactive engagement of the optical fibers with an inner wall of said tubular member, the excess length of each optical fiber being sufficient to allow the stiffness of said strength members to be a predetermined value which is relatively low.

2. The optical fiber cable of claim 1, wherein the length of each of said optical fibers exceeds the length of said tubular member by as much as 0.6 percent.

3. The optical fiber cable of claim 1 wherein said tubular member comprises a plastic material which is characterized by a relationship between applied load and strain which is substantially linear up to a strain corresponding to the excess length of each optical fiber at a given temperature.

4. The optical fiber cable of claim 3, wherein said plastic material of said tubular member comprises polybutylene terephthalate.

5. The optical fiber cable of claim 1, which also includes a waterblocking material which is disposed within said tubular member.

6. The optical fiber cable of claim 5, wherein said waterblocking material includes a filling material which is disposed within said tubular member.

7. The optical fiber cable of claim 6, wherein said filling material has a critical yield stress which is not greater than about 70 Pa at 20° C. and a shear modulus less than about 13 kPa at 20° C.

8. The optical fiber cable of claim 1, wherein said cable core comprises at least one bundle of optical fibers.

9. The optical fiber cable of claim 8, wherein said bundle is enclosed by a binder which is wrapped helically about each said bundle.

10. The optical fiber cable of claim 1, wherein said optical fiber bundle includes a plurality of optical fibers each of which includes at least one layer of a coating material and any buffereing layer thereover and wherein the single tubular member which encloses the core has a crosssectional area defined by an inner wall of said tubular member which is such that the ratio of the cross sectional area of the plurality of coated optical fibers to the cross sectional area within said tubular member does not exceed a predetermined value.

11. The optical fiber cable of claim 10, wherein said predetermined value does not exceed about 0.5.

* * * * *